United States Patent
Boutaghou et al.

(10) Patent No.: US 7,265,943 B2
(45) Date of Patent: Sep. 4, 2007

(54) AIR BEARING FOR A HEAD TO PROVIDE REDUCED CROSS-CURVE SENSITIVITY

(75) Inventors: Zine-Eddine Boutaghou, Vadnais Heights, MN (US); Ram M. Rao, Shorewood, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 47 days.

(21) Appl. No.: 10/295,530

(22) Filed: Nov. 15, 2002

(65) Prior Publication Data

US 2003/0231429 A1 Dec. 18, 2003

Related U.S. Application Data

(60) Provisional application No. 60/387,978, filed on Jun. 12, 2002.

(51) Int. Cl.
G11B 21/21 (2006.01)
G11B 5/60 (2006.01)
G11B 17/32 (2006.01)

(52) U.S. Cl. .................. 360/235.8; 360/235.7; 360/236.3

(58) Field of Classification Search ............ 360/236.5, 360/235.7, 235.8, 236.6, 236.3, 237, 235.4, 360/235.5
See application file for complete search history.

(56) References Cited

U.S. PATENT DOCUMENTS

| | | | | |
|---|---|---|---|---|
| 4,225,891 A * | 9/1980 | Plotto | ................ | 360/236.3 |
| 5,777,825 A | 7/1998 | Dorius | ................ | 360/103 |
| 6,004,472 A | 12/1999 | Dorius et al. | ................ | 216/22 |
| 6,055,128 A | 4/2000 | Dorius et al. | ................ | 360/103 |
| 6,069,769 A | 5/2000 | Dorius et al. | ................ | 360/103 |
| 6,188,547 B1 * | 2/2001 | Gui et al. | ................ | 360/236.5 |
| 6,311,388 B1 * | 11/2001 | Berg et al. | ................ | 360/235.4 |
| 6,333,835 B1 | 12/2001 | Kang et al. | ................ | 360/235.4 |
| 6,385,011 B1 | 5/2002 | Chang et al. | ................ | 360/234.3 |
| 6,483,667 B1 * | 11/2002 | Berg et al. | ................ | 360/235.6 |
| 6,504,682 B1 * | 1/2003 | Sannino et al. | ................ | 360/235.8 |
| 6,510,027 B1 * | 1/2003 | Chapin et al. | ................ | 360/235.8 |
| 6,560,071 B2 * | 5/2003 | Chapin et al. | ................ | 360/235.7 |
| 6,646,832 B2 * | 11/2003 | Anaya-Dufresne et al. | ...... | 360/236.3 |
| 6,661,611 B1 * | 12/2003 | Sannino et al. | ................ | 360/236.3 |
| 6,678,119 B1 * | 1/2004 | Pendray et al. | ................ | 360/236.6 |
| 6,707,631 B1 * | 3/2004 | Haddock | ................ | 360/235.8 |
| 6,731,464 B2 * | 5/2004 | Sasaki et al. | ................ | 360/236.3 |
| 2002/0008939 A1 | 1/2002 | Boutaghou et al. | | |
| 2002/0191340 A1 * | 12/2002 | Chapin et al. | ................ | 360/235.8 |
| 2003/0039073 A1 * | 2/2003 | Rao | ................ | 360/235.8 |
| 2003/0053253 A1 * | 3/2003 | Mundt et al. | ................ | 360/236.3 |
| 2003/0058578 A1 * | 3/2003 | Boutaghou et al. | ...... | 360/235.8 |

FOREIGN PATENT DOCUMENTS

JP 11016141 A * 1/1999

* cited by examiner

*Primary Examiner*—Craig A. Renner
(74) *Attorney, Agent, or Firm*—Westman, Champlin & Kelly P.A.

(57) ABSTRACT

An air bearing for a slider including cooperating raised bearing surfaces or portions along a trailing edge portion of the slider. The cooperating raised bearing surfaces or portions are formed on a stepped bearing surface which is elevated above a recessed bearing surface. The cooperating raised bearing surfaces or portions form raised rails or rails portions or a raised center pad or raised center pad portion on the stepped bearing surface to reduce cross curve sensitivity.

18 Claims, 12 Drawing Sheets

AIR BEARING FOR A HEAD TO PROVIDE REDUCED CROSS-CURVE SENSITIVITY

CROSS-REFERENCE TO RELATED APPLICATION

This application claims priority from U.S. Provisional Application No. 60/387,978 filed on Jun. 12, 2002 and entitled "AIR BEARING DESIGN TAILORED FOR REDUCED SENSITIVITY TO CROSS CURVE".

FIELD OF THE INVENTION

The present invention relates generally to data storage devices, and more particularly but not by limitation to an air bearing design for a data storage device.

BACKGROUND OF THE INVENTION

Data storage devices store digital information on a disc or storage media. Heads read data from or write data to the data storage disc. Heads include transducer elements, such as inductive, magneto-resistive and magneto-optical transducer elements for read-write operations. Heads are coupled to an actuator assembly via a head suspension assembly and the actuator assembly is energized to position the heads relative to selected data tracks for read-write operations. The head suspension assembly includes a load beam which supplies a load force to the head at a load or gimbal point. The head is coupled to the suspension assembly or load beam through a gimbal spring so that the head pitches and rolls relative to the load or gimbal point to follow the contour of the disc or data storage surface.

Transducer elements of the head are carried on a trailing edge of an air bearing slider for proximity, near proximity or near contact recording. The air bearing slider includes at least one raised bearing surface and at least one recessed bearing surface. Rotation of the disc or storage medium provides an air flow along the air bearing surface of the slider to provide a hydrodynamic lifting force which is countered by the load force to define in part a fly height for the slider for read-write operations. Head-disc spacing or fly height is controlled in part by air bearing pressurization, where as the fly height decreases, air bearing pressure increases and air bearing pressure decreases as the fly height increases to provide a relatively stable fly height. Areal disc drive density is increasing requiring lower fly heights or head-disc spacing between the transducer elements at the trailing edge of the slider (or pole tip fly height (PTFH)) and the disc surface for desired read-write resolution and clarity. The lower fly heights demand better control over pressurization of the air bearing surfaces.

Variations in the relative linear velocity of the rotating disc between the inner and outer diameters of the disc and variations in the skew angle between the head and disc relative to the inner and outer diameters of the disc can affect air bearing pressurization or fly height of the slider based upon radial position of the head. Heads are fabricated by a wafer fabrication process which can introduce a cross curve between opposed sides, along a cross dimension or width, of the slider or head. The cross curve can affect pressurization or the pressure profile of independent bearing surfaces across the cross dimension or width of the head or slider. Embodiments of the present invention provide solutions to these and other problems, and offer other advantages over the prior art.

SUMMARY OF THE INVENTION

The present invention relates to an air bearing for a slider including cooperating raised bearing surfaces or portions along a trailing edge portion of the slider. The cooperating raised bearing surfaces or portions are formed on a stepped bearing surface which is elevated above a recessed bearing surface. In embodiments of the present invention, cooperating raised bearing surfaces or portions form raised rails or rails portions or a raised center pad or raised center pad portion on the stepped bearing surface to reduce cross curve sensitivity. Other features and benefits that characterize embodiments of the present invention will be apparent upon reading the following detailed description and review of the associated drawings.

DETAILED DESCRIPTION OF ILLUSTRATIVE EMBODIMENTS

Figure 1:
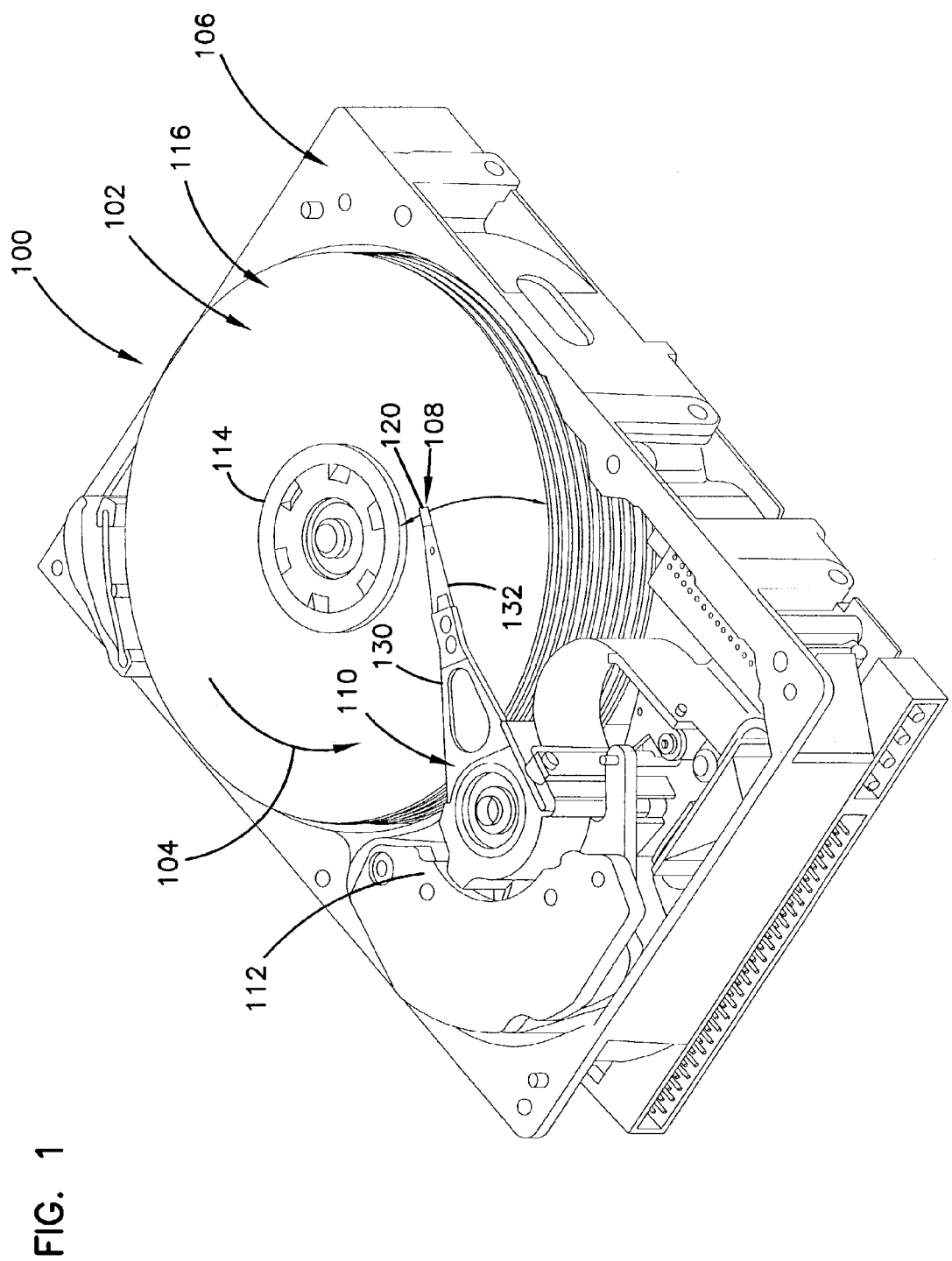
FIG. 1 is perspective illustration of a data storage device.

FIG. 1 is a perspective illustration of an embodiment of a data storage device 100 in which embodiments of the present invention are useful. Device 100 includes at least one data storage disc 102 rotationally (as illustrated by arrow 104) coupled to a base chassis 106 by a spindle motor (not shown). Heads 108 are coupled to an actuator assembly 110 as shown. A voice coil motor 112 is coupled to the actuator assembly 110 and is operational to position the heads 108 relative to selected data tracks between an inner diameter 114 and an outer diameter 116 of the disc 102 for read-write operations through interface with a host system (not shown).

Figure 2:
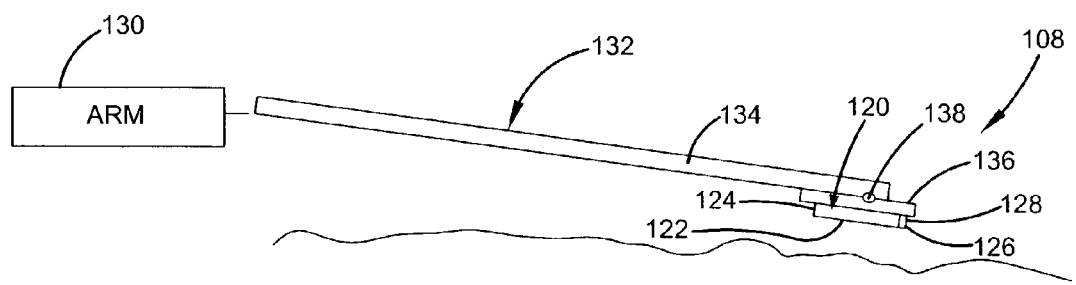
FIG. 2 is a schematic elevational view of a head suspension assembly having a head or slider coupled thereto.

The head 108 includes a slider 120 having an air bearing surface 122, a leading edge 124 and a trailing edge 126 as shown in FIG. 2. Rotation of the disc 102 provides an air flow along the air bearing surface 122 of the slider from the leading edge 124 to the trailing edge 126 for operation. In the illustrated embodiment, transducer elements 128 (illustrated schematically) are fabricated proximate to the trailing edge 126 of the slider 120. Transducer elements include, but are not limited to inductive, magneto-resistive, tunneling magneto-resistive and magneto-optical transducer elements.

Figure 3:
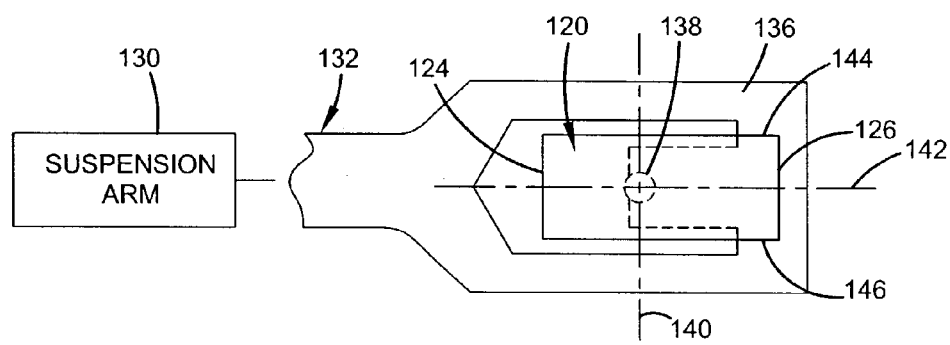
FIG. 3 is a schematic illustration of a head or slider coupled to a head gimbal assembly.

As shown in FIGS. 2-3, heads 108 are coupled to an actuator arm 130 of the actuator assembly 110 through a head suspension assembly 132 including a load beam 134 and a gimbal spring 136. As shown, the load beam 134 is adapted to supply a load force to the slider 120 at a load point 138 (shown in FIG. 3) which is opposed to a hydrodynamic lifting force of the air bearing surface 122 of the slider 120 to define in part a fly height for the slider above the disc surface. The slider is flexibly coupled to the gimbal spring 136 to pitch about a pitch axis 140 and roll about a roll axis 142 between opposed sides 144, 146 of the slider. The slider pitches and rolls relative to the gimbal or load point 138 to follow the contour of the disc surface for read-write operations.

Figure 4:
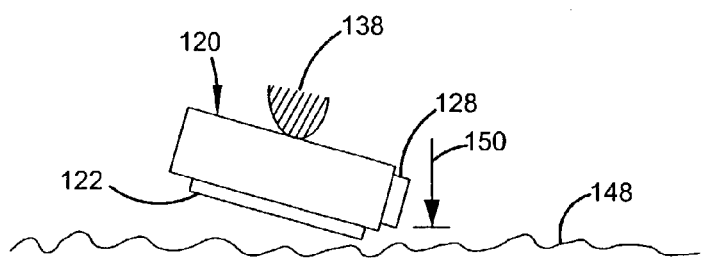
FIG. 4 is a diagrammatic illustration of a head or slider relative to a disc surface for read-write operations.

As illustrated in greater detail in FIG. 4, for operation, transducer elements 128 are spaced from the disc surface 148 to provide a head-disc spacing or PTFH 150 between the transducer elements 128 and the disc surface 148 for read-write operations. Areal disc drive density is increasing, reducing head-disc spacing parameters for desired read-write resolution and clarity. The reduced spacing or PTFH requires better fly height control or tolerance between the transducer elements and the disc surface.

Figure 5:
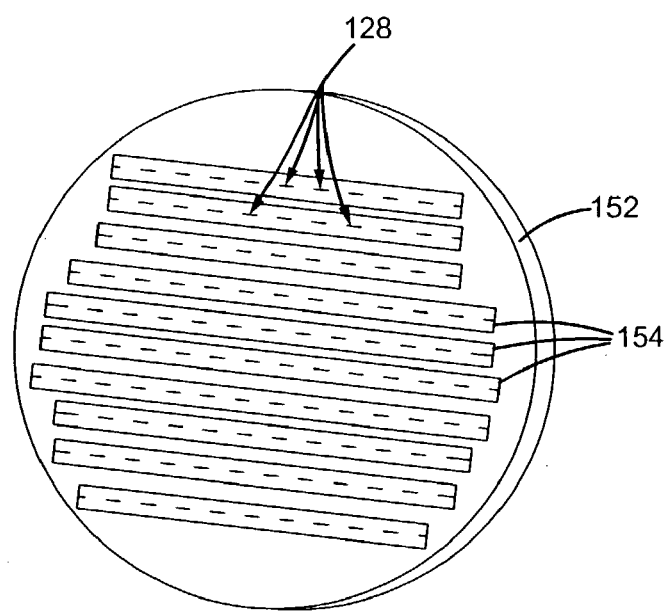
FIG. 5 is a schematic illustration for wafer fabrication of heads.
Figure 6:
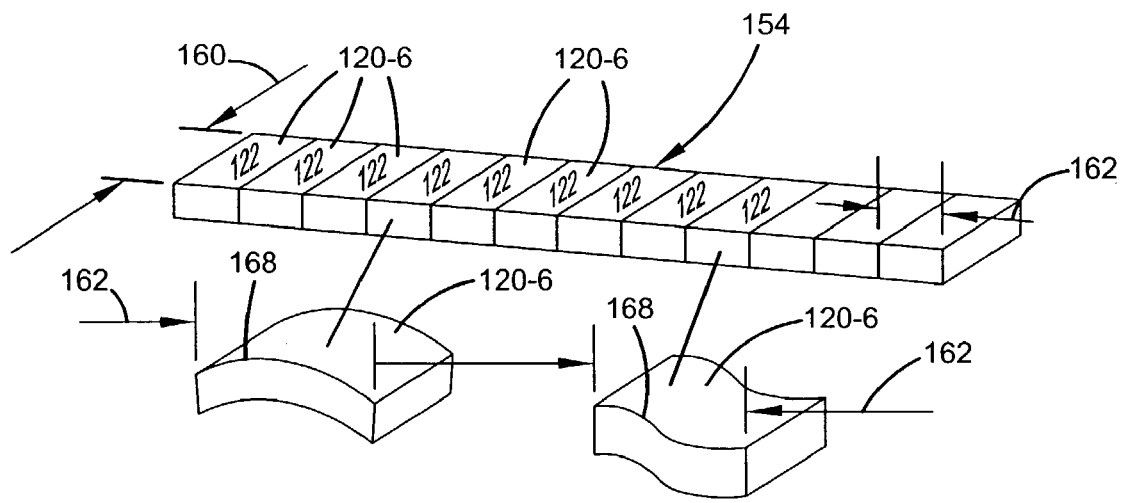
FIG. 6 schematically illustrates a slider bar and a cross curve for sliders therealong.

Heads are typically fabricated by a wafer fabrication process. In the embodiment illustrated in FIGS. 5-6, a plurality of transducer elements 128 are deposited on a wafer 152. Slider bars 154 are diced from the wafer 152 as shown in FIG. 6. Air bearing surfaces 122 for a plurality of sliders 120-6 are formed on the slider bar 154. The slider bar 154 is lapped to provide a desired stripe height for the transducer elements 128 and individual sliders 120-6 are sliced from the slider bar 154. As shown a thickness dimension 160 of the slider bar 154 or wafer 152 forms a longitudinal length of the sliders 120-6 between the leading and trailing edges of the sliders 120-6 and a cross dimension 162 of the sliders 120-6 is formed along a longitudinal length of the slider bar 154.

As shown, the fabrication process can introduce a cross curve or bow 168 along the cross width or dimension 162. The cross curve 168 can affect a pressure profile of the air bearing surface of the slider. Air bearing surfaces 122 of sliders are designed to provide an optimum pressure profile to control fly height of the slider 120. The cross curve 168 and the radial position of the head relative to the disc can introduce variations in the pressure profile of the slider interfering with optimum fly height control. For example, the pressure profile of individual sliders can vary due to manufacturing processes and cross curve 168 of the slider.

FIGS. 7-10 illustrate a embodiment of a multi-tiered air bearing surface for a prior art slider 120-7 where like numbers are used to refer to like parts in the previous FIGS. In the illustrated embodiment, the slider 120-7 includes a slider body 170-7 having a leading edge 124-7, a tailing edge 126-7 and opposed sides 144-7, 146-7. As shown, the slider 120-7 includes a leading edge portion 172 proximate to the leading edge 124-7, an intermediate portion 174 and a trailing edge portion 176 proximate to the trailing edge 126-7. The illustrated slider 120-7 includes multi bearing surface tiers including stepped bearing surfaces elevated above a recessed or etch surface and raised bearing surfaces elevated above the stepped bearing surfaces. In the particular illustrated embodiment slim in FIGS. 7-8, the leading edge portion 172 includes raised bearing surfaces 180-1, 180-2 formed along opposed rails 182, 184 and stepped bearing surface 186-1 elevated above the recessed or etched surface.

Figure 7:
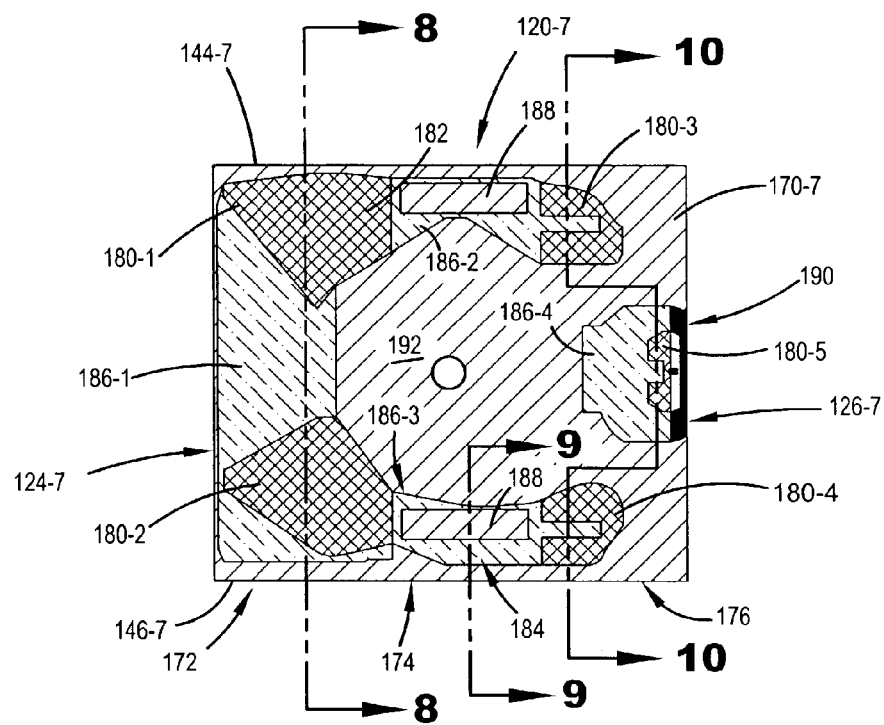
FIGS. 7-10 schematically illustrate a prior art embodiment of an air bearing surface of a head or slider.
Figure 8:
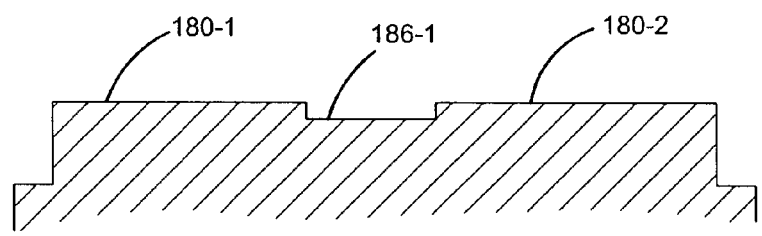
Figure 9:
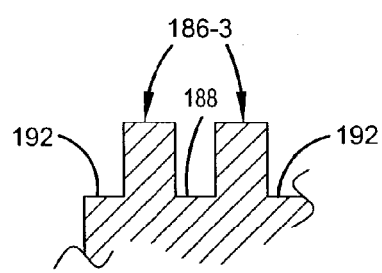
Figure 10:
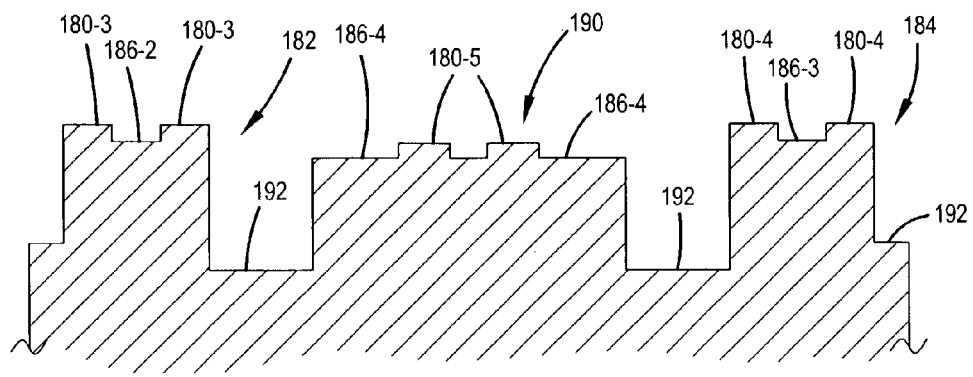

As illustrated in FIGS. 7 and 9, the intermediate portion 174 includes stepped bearing surfaces 186-2, 186-3 formed along rails 182, 184. The stepped bearing surfaces 186-2, 186-3 include a recessed or etched cavity 188 forming a recessed or etched surface along rails 182, 184. As illustrated in FIGS. 7 and 10, the trailing edge portion 176 includes opposed raised bearing surfaces 180-3, 180-4 formed on stepped bearing surfaces 186-2, 186-3 along opposed rail 182, 184 and raised bearing surface 180-5 form on stepped bearing surface 186-4 forming a center pad 190 of the slider elevated above the etched or recessed region 192 forming the recessed or etched surface portions of the slider. As shown in FIG. 10, the raised bearing surfaces 180-3, 180-4 of rails 182, 184 and the raised bearing surface 180-5 of center pad 190 are separated by the recessed surface or region 192 to form independent bearing surfaces.

Figure 11:
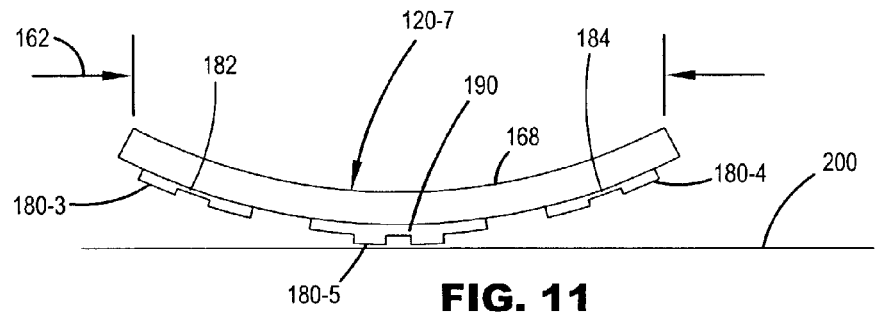
FIG. 11 schematically illustrates the slider of FIGS. 7-10 having a cross curve.

FIG. 11 illustrates a cross profile of the trailing edge portion of the slider 120-7 embodiment of FIGS. 7-10. The raised bearing surfaces 180-3, 180-4, 180-5 of rails 182, 184 and center pad 190 along the trailing edge portion of the slider provide active bearing surfaces to control fly height or spacing for the transducer elements PTFH relative to the disc surface. In particular, each of the independent raised surfaces of the rails 182, 184 and center pad 190 contribute to fly height control. As illustrated in great exaggeration in FIG. 11 for a slider having a cross curve 168 relative to reference 200, the raised bearing surfaces of the rails 182, 184 and center pad 190 are offset relative to one another along the cross dimension 162. The offset relation of the raised bearing surfaces as shown affects the pressure profile along the air bearing surface and fly height control.

Figure 12:
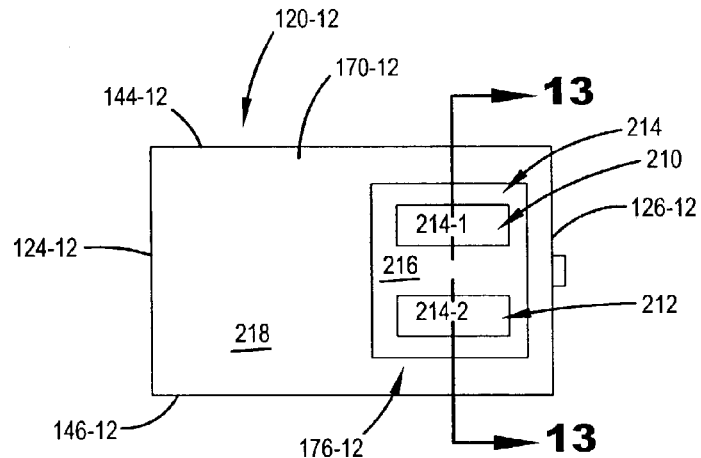
FIGS. 12-13 schematically illustrate an air bearing embodiment having multiple raised bearing surfaces on an integral stepped bearing surface.
Figure 13:
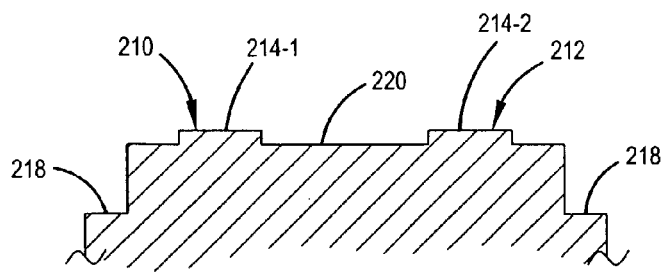

The present invention provides an air bearing slider having multiple cooperating bearing surfaces to reduce the affect of cross curve on air bearing pressurization or pressure profile, or reduce cross-curve sensitivity. FIGS. 12-13 schematically illustrate an embodiment of a slider 120-12 of the present invention where like numbers are used to refer to like parts in the previous FIGS. In the illustrated embodiment shown, the slider 120-12 includes a slider body including a leading edge 124-12, a trailing edge 126-12 and opposed sides 144-12, 146-12. As shown, the slider 120-12 includes spaced raised bodies 210, 212 formed on a trailing edge portion 176-12 of the slider to form a plurality of raised bearing surfaces 214-1, 214-2. The raised bearing surfaces 214-1 and 214-2 are active bearing surface and not pads or projections for stiction control for contact starts and stops.

As shown, the spaced raised bodies 210, 212 are formed on a stepped portion 216 elevated above a recessed surface 218 of the slider body 170-12. The stepped portion 216 is elevated above the recessed portion 218 to form a stepped bearing surface 220 and the raised bearing surfaces 214-1, 214-2 are elevated above the stepped bearing surface 220. As shown, the raised bodies 210, 212 are cooperatively formed on the stepped bearing portion 216 to provide cooperating active or raised bearing surfaces 214-1, 214-2. The cooperating raised or active bearings surfaces 214-1, 214-2 are not separated by a recessed surface or region and are cooperatively pressurized relative to the stepped bearing surface 220 to reduce cross curve sensitivity since milling deformations for the air bearing structure deform in one plane as opposed to deforming in multiple planes.

Figure 14:
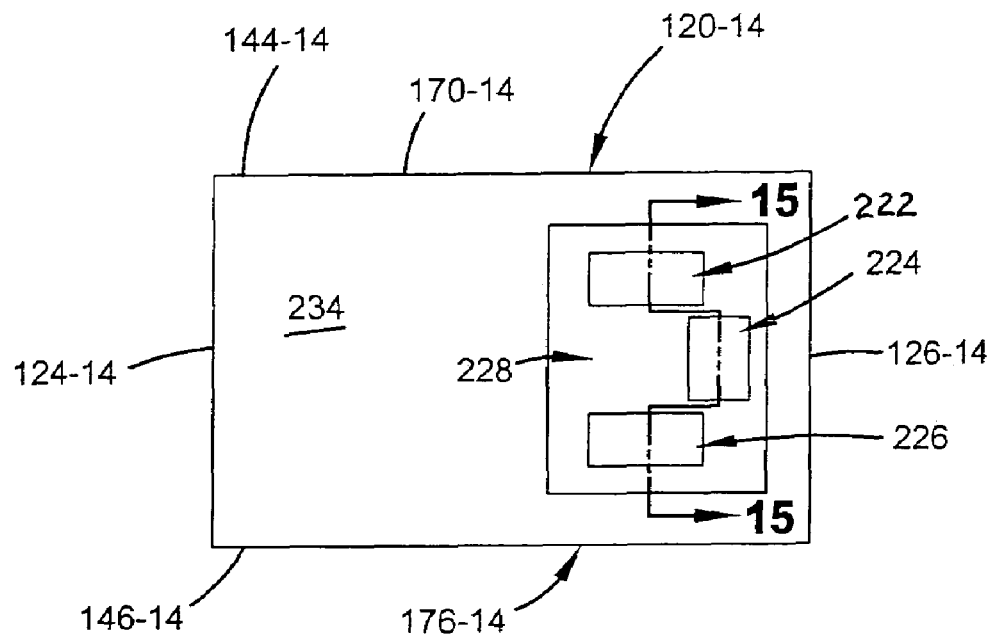
FIGS. 14-15 schematically illustrate an alternate air bearing embodiment having multiple raised bearing surfaces on an integral stepped bearing surface.
Figure 15:
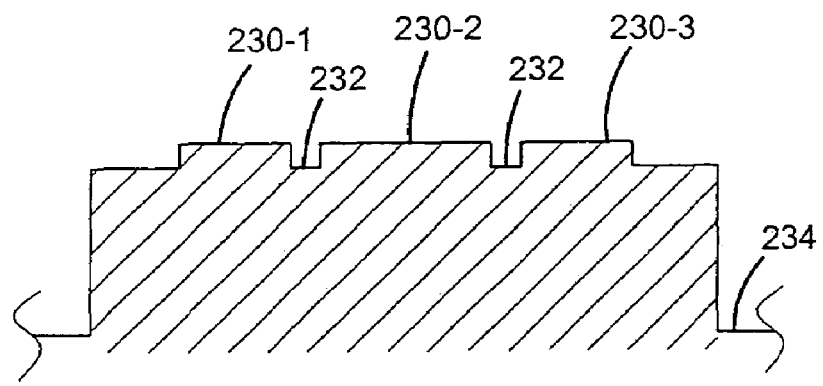

In an alternate slider 120-14 embodiment illustrated in FIGS. 14-15, the slider 120-14 includes a leading edge 124-14, a trailing edge 126-14 and opposed sides 144-14, 146-14. As shown, the slider 120-14 includes raised bodies 222, 224, 226 formed on a stepped bearing portion 228 along a trailing edge portion 17614 of the slider body 170-14. As shown in FIG. 15, raised bodies 222, 224, 226 form raised bearing surfaces 230-1, 230-2, 230-3 elevated above a stepped bearing surface 232 formed by the stepped bearing portion 228. The stepped bearing surface 232 is elevated above a recessed bearing surface 234 as shown. As shown raised bodies 222, 224, 226 are cooperatively formed on the stepped bearing portion 228 to provide multiple raised or active bearing surfaces 230-1, 230-2, 230-3 along the trailing edge portion which are not separated by recessed surfaces or portions to reduce cross curve sensitivity as previously described. In the illustrated embodiment of FIGS. 12-13, raised bodies 210, 212 form raised bearing rails and in the illustrated embodiment of FIGS. 14-15 raised bodies 220, 226 form raised bearing rails and raised body 224 forms a raised center pad for operation.

Figure 16:
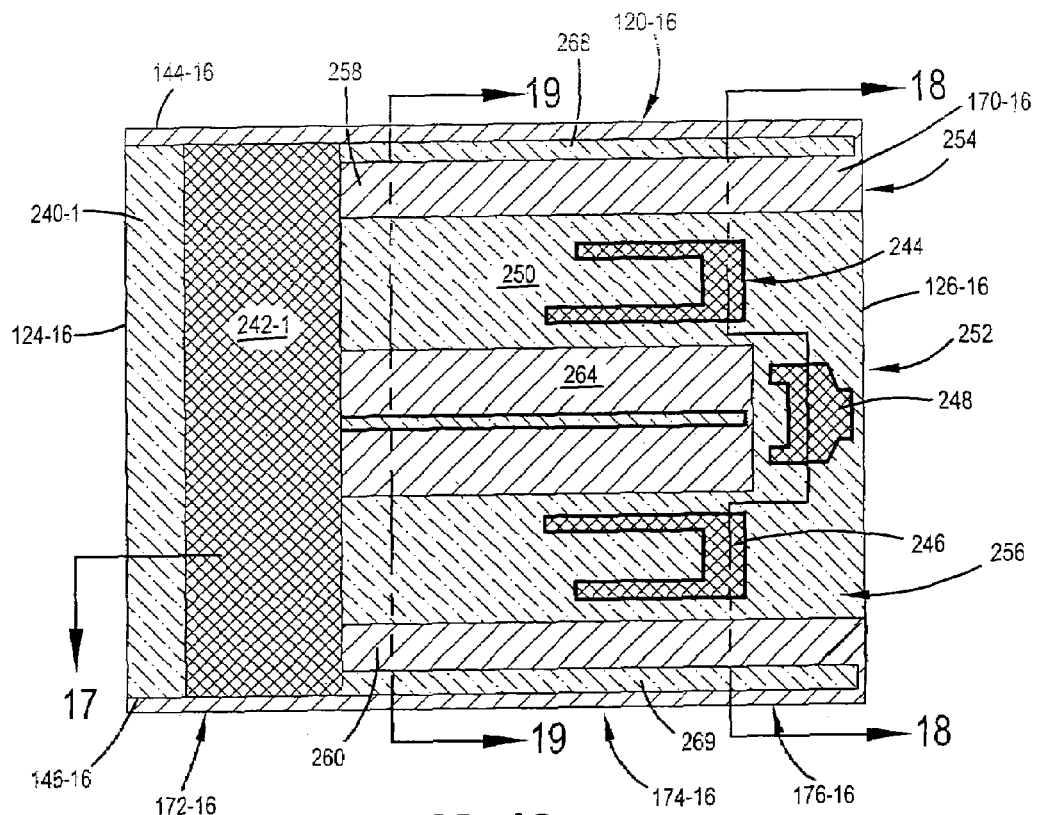
FIGS. 16-19 schematically illustrate an air bearing embodiment having multiple raised bearing surfaces cooperatively formed along a trailing edge portion of a slider.
Figure 17:
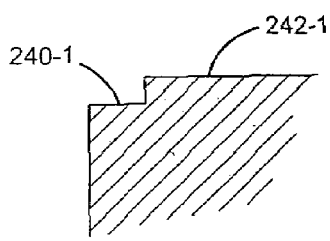
Figure 18:
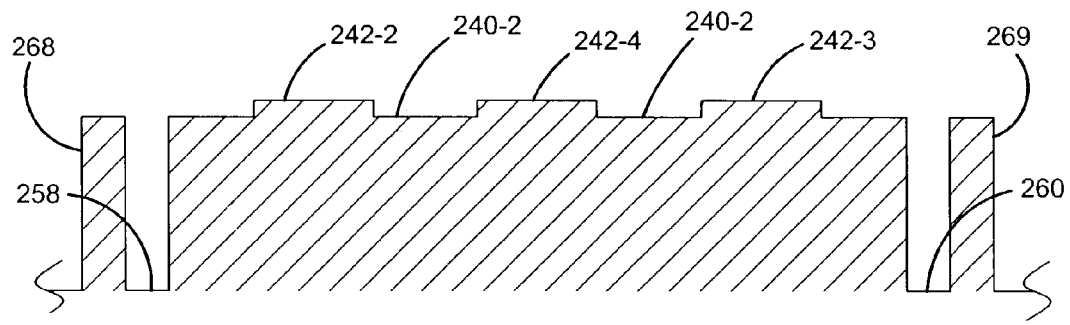

FIGS. 16-19 illustrate an alternate slider embodiment including cooperating raised or active bearing surfaces along a trailing edge portion of the slider body. The slider 120-16 includes a leading edge 124-16, a trailing edge 126-16 and opposed sides 144-16, 146-16 to form a leading edge portion 172-16, trailing end portion 176-16 and intermediate portion 174-16. The slider body or air bearing also includes a stepped bearing surface elevated above a recessed bearing surface and raised bearing surfaces elevated above the stepped bearing surface. In particular, as shown in FIGS. 16-17, the leading edge portion 172-16 includes a leading edge stepped bearing surface 240-1 and raised bearing surface 2421. As illustrated in FIGS. 16 and 18, the trailing edge portion 176-16 includes raised bodies 244, 246, 248 formed on a stepped bearing portion 250. As illustrated in FIG. 18, the raised bodies 244, 246, 248 form raised or active bearing surfaces 242-2, 242-3, 242-4 along the trailing edge portion 176-16 and the stepped bearing portion 250 forms stepped bearing surface 240-2 to pressurize the multiple raised bearing surfaces 242-2, 242-3, 242-4. As shown, the raised bearing surfaces 242-2, 242-3, 242-4 along the trailing edge portion are integral with the stepped bearing surface 240-2 to cooperatively pressurize the active or raised bearing surfaces without intervening cavities or recessed surfaces.

In the illustrated embodiment, the stepped bearing portion 250 and raised bodies 244, 246, 248 formed thereon are formed along a center portion 252 between opposed side portions 254, 256 of the slider body 170-16. As shown, the raised bodies 244, 246, 248 form active bearing surfaces 242-2, 242-3, 242-4 along the center portion 252 spaced from the opposed sides 144-16, 146-16 of the slider body to reduce the distance of the active bearing surfaces from a center portion of the slider body to reduce sensitivity to cross curve.

In the embodiment shown, the raised bodies 244, 246 form raised bearing rails and the raised body 248 forms a raised center pad. The raised bearing rails are positioned closer to the raised center pad than in prior art embodiments to provide cooperating bearing surfaces positioned close to a center portion of the slider body to reduce sensitivity to cross curve. The position of the raised bearing rails relative to the raised center pad can be optimized to provide desired roll stiffness based upon the particular structure of the slider. In the illustrated embodiment, the raised bodies 244, 246 or bearing rails are generally "U" shaped, although application is not limited to any particular shape.

Figure 19:
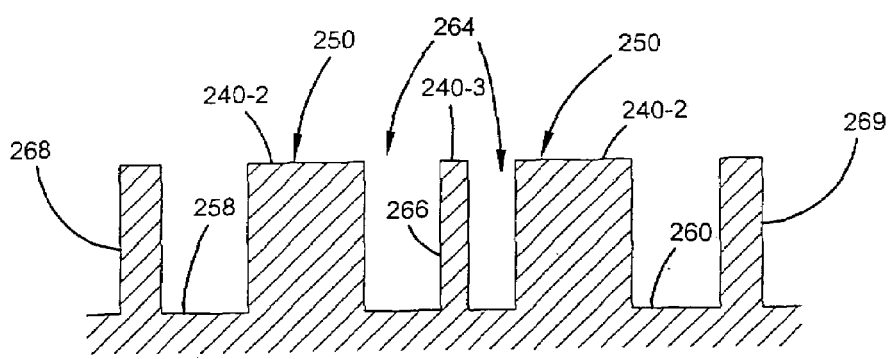

In the illustrated embodiment, the stepped bearing portion 250 extends from the raised bearing surface 242-1 proximate to the trailing edge. As shown in FIGS. 16 and 19, the air bearing includes recessed cavities 258, 260 on opposed sides of the stepped bearing portion 250 forming recessed surfaces of the air bearing. The stepped bearing portion 250 includes a recessed cavity 264 along a length thereof to form a recessed bearing surface of the slider. In the particular embodiment illustrated, the recessed cavity 264 includes a stepped portion 266 forming a stepped bearing surface 240-3 as shown in FIG. 19. The stepped surface portions of the illustrated air bearing provide a better imaging surface for air bearing modeling using digital scanning or imaging techniques over prior art embodiments having recessed bearing surfaces. The illustrated embodiment includes stepped rail portions 268, 269 along opposed sides 144-16, 146-16 of the slider.

Figure 20:
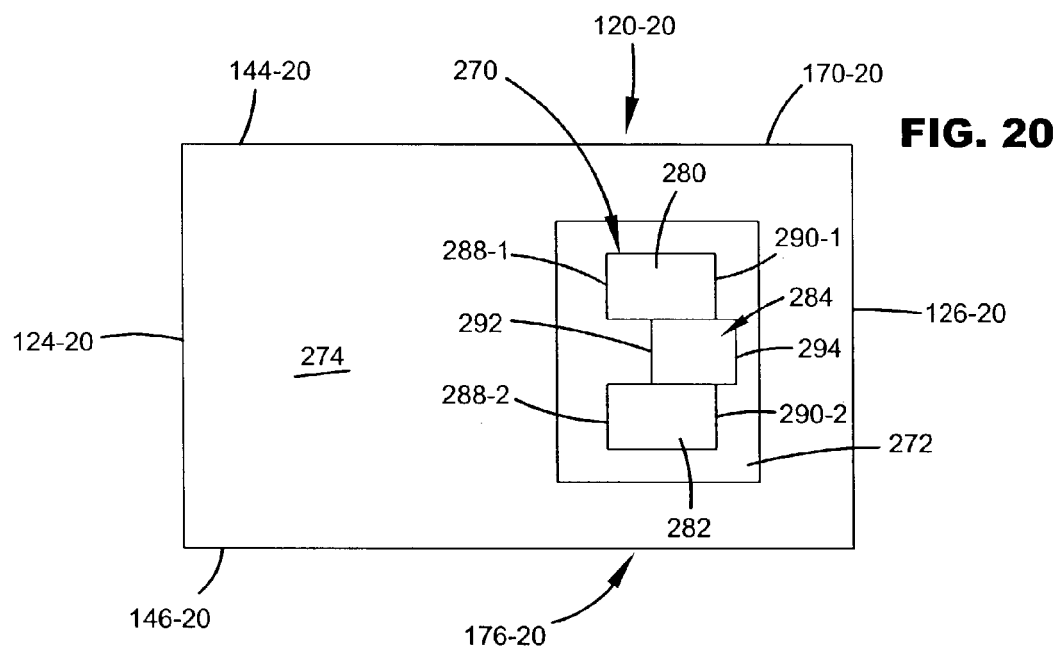
FIGS. 20-21 schematically illustrate an air bearing embodiment including cooperating raised bearing portions formed on a stepped surface along a trailing edge portion of a slider.
Figure 21:
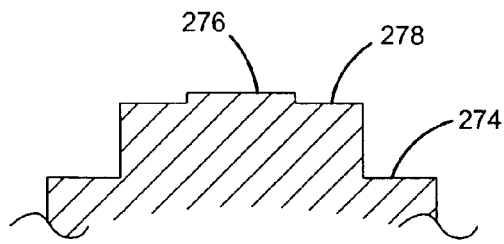

FIGS. 20-21 schematically illustrate an alternate embodiment of the present invention where like numbers are used to refer to like parts in the previous FIGS. As shown, the slider 120-20 includes a slider body 170-20 having a leading edge 124-20, trailing edge 126-20 and opposed sides 144-20, 146-20. The slider 120-20 includes a raised body 270 formed on and elevated above stepped bearing portion 272 on a trailing edge portion 176-20 of the slider body. The stepped bearing portion 272 is elevated above a recessed bearing surface or region 274 so that the raised body 270 forms a raised bearing surface 276 elevated above a stepped bearing surface 278 and the stepped bearing surface 278 is elevated above the recessed bearing surface 274. The raised body 270 includes opposed raised rail portions 280, 282 and a raised center portion 284 to cooperatively formed raised bearing rails and a raised center pad on the trailing edge portion of the slider body without intervening recessed surfaces or regions as previously described.

As illustrated in the embodiment of FIGS. 20-21, the raised rail portions 280, 282 include a leading edge 288-1, 288-2 and a trailing edge 290-1, 290-2 and the raised center portion 284 includes a leading edge 292 and trailing edge 294. As shown, the leading edges 288-1, 288-2 of the raised rail portions 280, 282 are closer to the leading edge 124-20 of the slider body than the leading edge 292 of the raised center portion 284 and the trailing edges 290-1, 290-2 of the raised rail portions 280, 282 are closer to the leading edge 124-20 of the slider body than the trailing edge 294 of the raised center portion 284 to form an air bearing having raised bearing rails and raised center pad to reduce sensitivity to cross curve.

Figure 22:
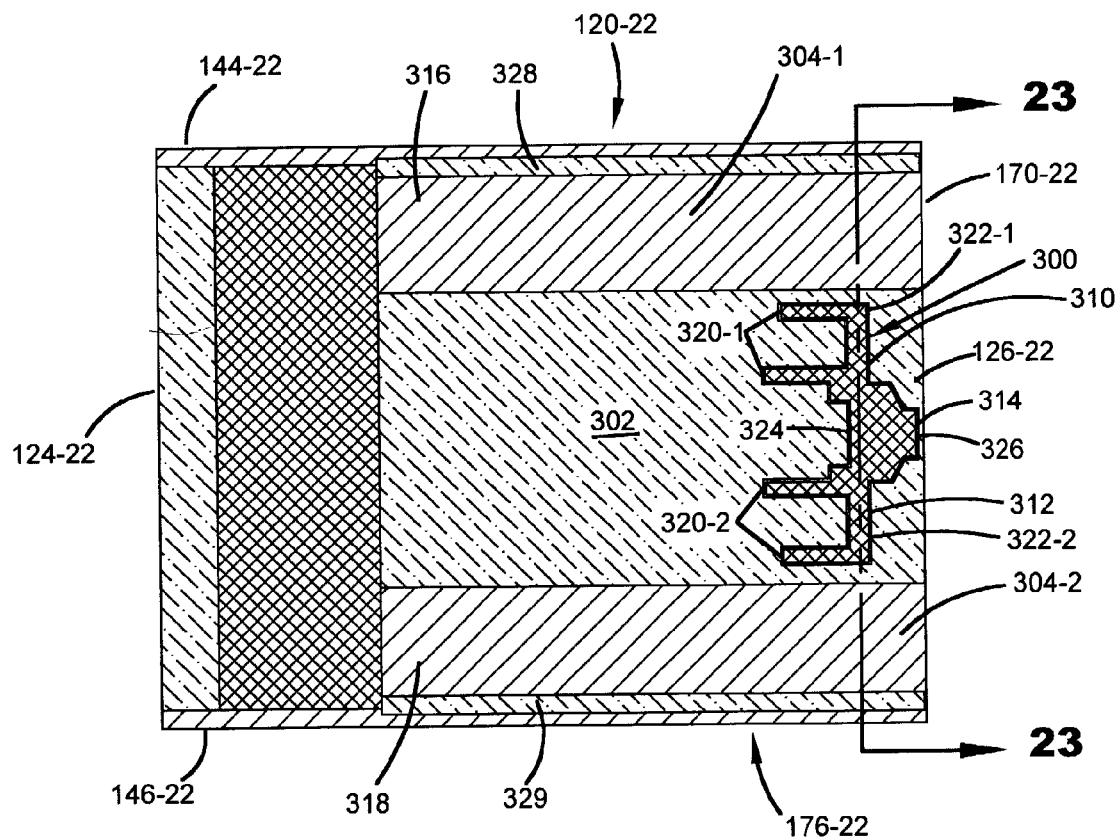
FIGS. 22-23 schematically illustrate an air bearing embodiment having multiple raised bearing portions cooperatively formed along a trailing edge portion of a slider.
Figure 23:
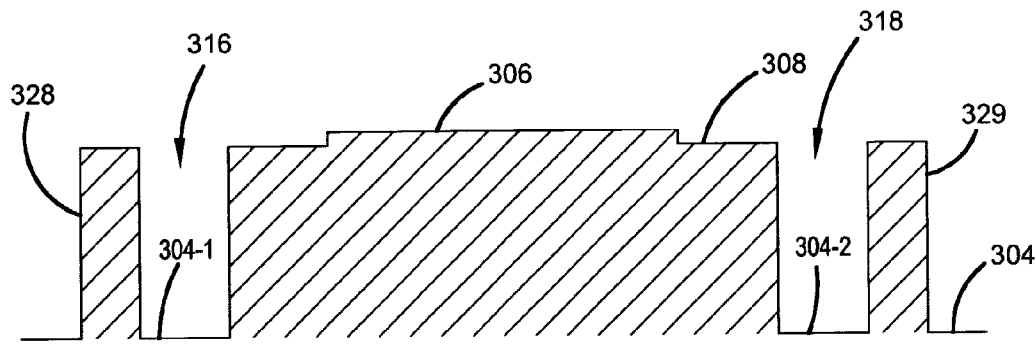

FIGS. 22-23 illustrate an alternate embodiment of a slider 120-22 including a slider body 170-22 having a leading edge 124-22, and trailing edge 126-22. As shown, the slider includes a raised body 300 formed on a stepped bearing portion 302 along a trailing edge portion 176-22 of the slider body. The stepped bearing portion 302 is elevated above a recessed bearing surface or region 304 to form a raised bearing surface 306 elevated above a stepped bearing surface 308 and stepped bearing surface 308 elevated above the recessed bearing surface 304. The raised body 300 includes opposed raised rail portions 310, 312 and a raised center portion 314 to cooperatively formed raised bearing rails and a raised center pad on the trailing edge portion 176-22 of the slider body without intervening recessed surfaces or regions as previously described.

In the illustrated embodiment, the raised rail portions 310, 312 are generally "U" shaped and are positioned on opposed sides of the raised center portion 314 forming the raised center pad of the air bearing. In the illustrated embodiment, the stepped bearing portion 302 is formed along a center portion of the slider body between opposed side portions. As shown, the air bearing includes opposed recessed cavities 316, 318 on opposed sides of the stepped bearing portion 302 to form recessed bearing surfaces 304-1, 304-2 below the stepped bearing surface 308.

The raised rail portions 310, 312 include a leading edge 320-1, 320-2 and a trailing edge 322-1, 322-2 and the raised center portion 314 includes a leading edge 324 and trailing edge 326. As shown, the leading edges 320-1, 320-2 of the raised rail portions 310, 312 are closer to the leading edge 124-22 of the slider body than the leading edge 324 of the raised center portion 314. As shown, the trailing edges 322-1, 322-2 of the raised rail portions 310, 312 are closer to the leading edge 124-22 of the slider body than the trailing edge 326 of the raised center portion 314 to form an air bearing having a raised body 300 including raised bearing rails and a raised center pad to reduce sensitivity to cross curve as described. In the embodiments described, the raised, stepped and recessed surfaces are formed using multiple masking and etching steps to form the multiple surface tiers. The illustrated embodiment includes stepped rails portions 328, 329 along opposed sides 144-22, 146-22 of the slider. In an alternate embodiment, an etched or recessed cavity can be formed in a center portion of stepped bearing portion 302.

Figure 24:
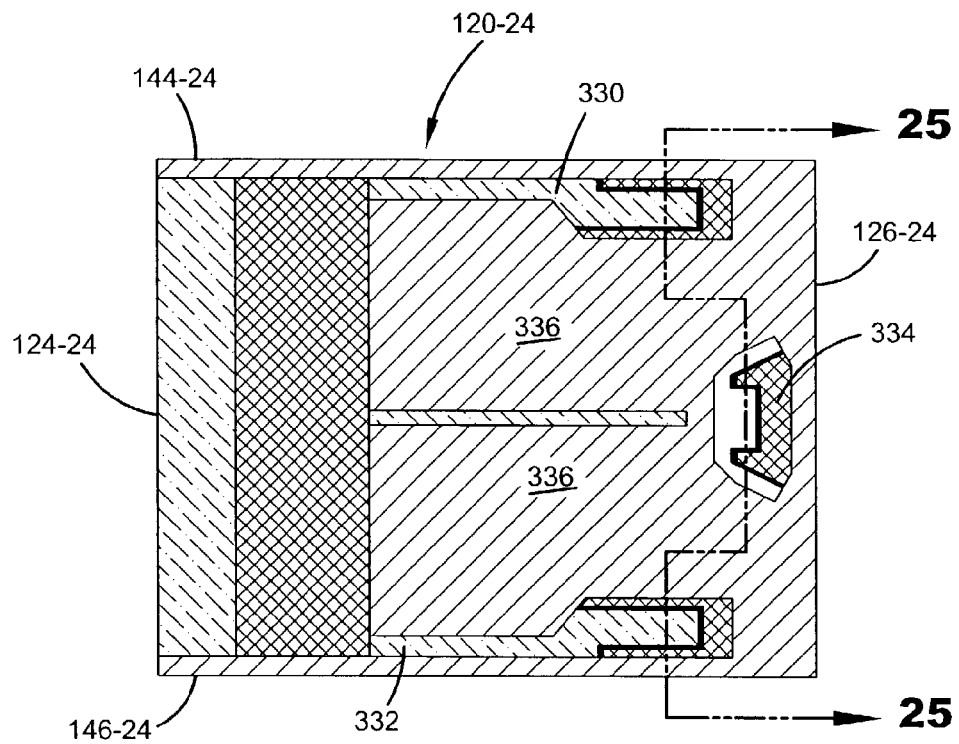
FIGS. 24-25 schematically illustrate an air bearing embodiment of the prior art.
Figure 25:
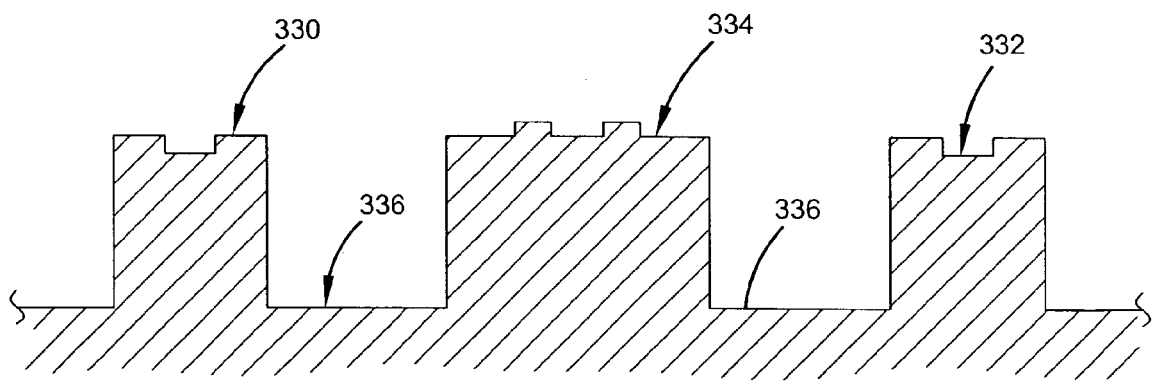
Figure 26:
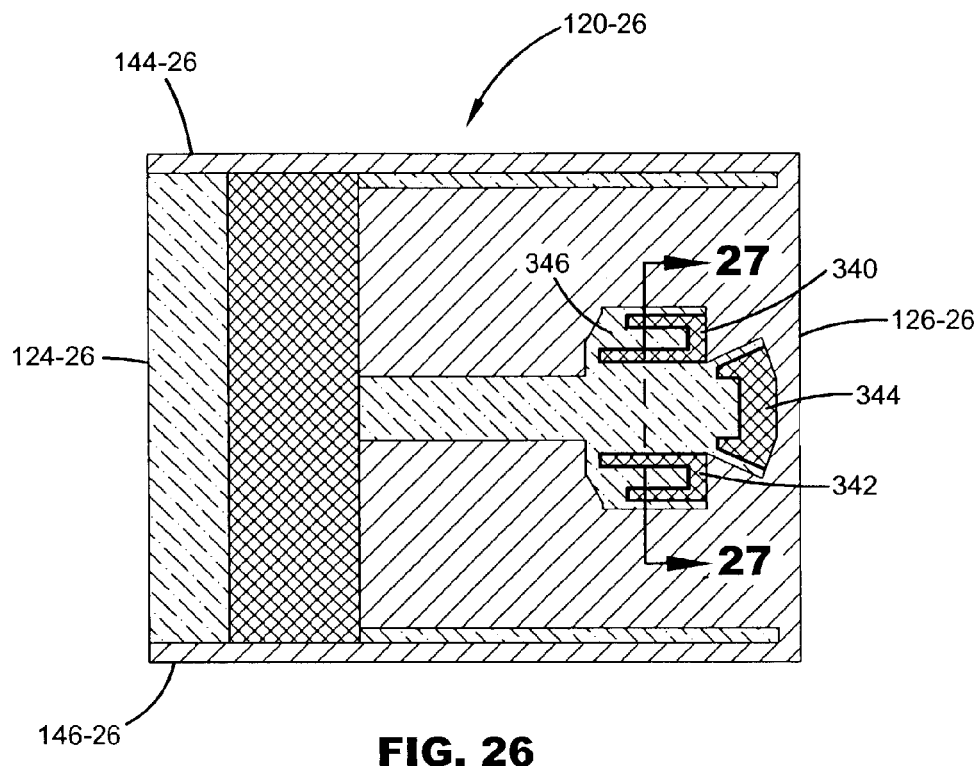
FIGS. 26-27 schematically illustrate an air bearing embodiment having multiple cooperating raised bearing surfaces formed along a trailing edge portion of a slider.
Figure 27:
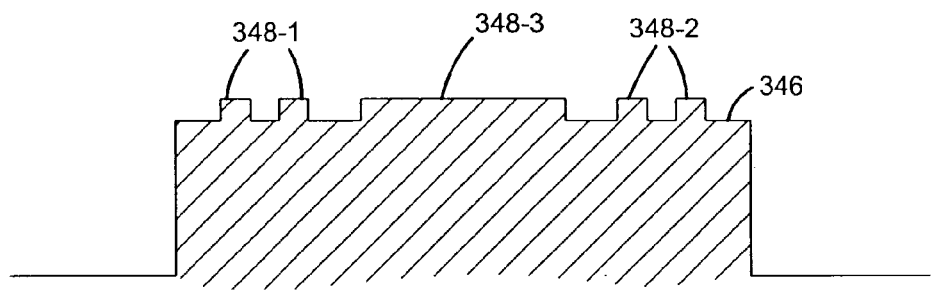

FIGS. 24-25 illustrate a prior art—slider embodiment including a slider body having a leading edge 124-24 and trailing edge 126-24. As shown bearing rails 330, 332 including raised and stepped bearing surfaces are formed along or proximate to opposed sides 144-24, 146-24 of the slider body and center pad 334 including raised and stepped bearing surfaces is formed along a center portion of the slider body. As shown, the rails 330, 332 and center pad 334 are separated by a recessed cavity or region 336 to provide independent bearing surfaces. In contrast as illustrated in FIGS. 26-27, the slider includes a slider body having a leading edge 124-26, trailing edge 126-26 and opposed sides 144-26, 146-26. The slider as shown includes raised rail bodies 340, 342 and a raised center body 344 formed on a stepped bearing surface 346 to form cooperating raised bearing surfaces 348-1, 348-2, 348-3 pressurized relative to the stepped bearing surface 346 which as illustrated in FIG. 28 provides less sensitivity to cross curve since milling deformations for the air bearing structure deform in one plane as opposed to deforming in multiple planes.

Figure 28:
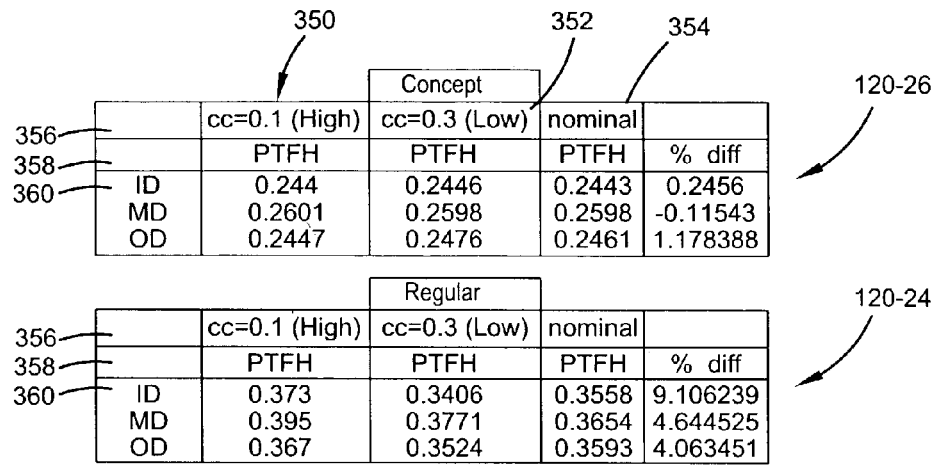
FIG. 28 comparatively illustrates PTFH for various cross curves (cc) for the sliders of FIGS. 24-25 and FIGS. 26-27.

FIG. 28 generally illustrates PTFH for different cross curves (cc=0.1 illustrated at column 350, cc=0.3 illustrated at column 352, and nominal illustrated at column 354) for different radial positions (inner diameter ID illustrated at row 356, middle diameter MD illustrated at row 358 and outer diameter OD illustrated at row 360) for the prior art slider embodiment 120-24 of FIGS. 24-25 and slider embodiment 120-26 of FIGS. 26-27. As shown, PTFH for the slider 120-26 embodiment of FIGS. 26-27 varied less relative to cc at different radial head positions providing less sensitivity to cross curve than the prior art slider embodiment 120-24 of FIGS. 24-25.

Figure 29:
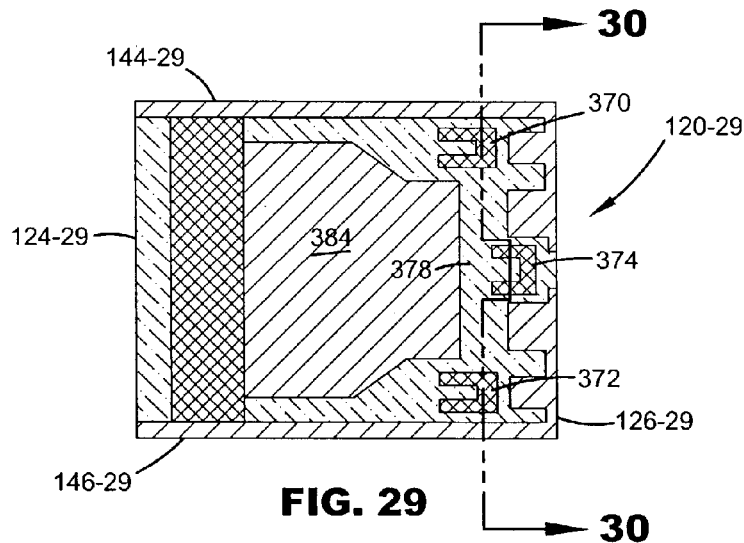
FIGS. 29-30 schematically illustrate an air bearing embodiment including multiple cooperating raised bearing surfaces formed along a trailing edge portion of a slider.
Figure 30:
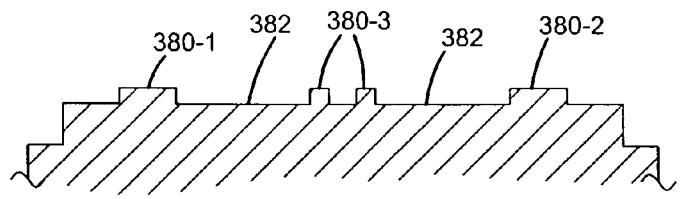

FIGS. 29-30 illustrate an alternate embodiment of a slider 120-29 having cooperating bearing surfaces on a slider body having a leading edge 124-29 and trailing edge 126-29. As shown, the slider body 120-29 includes opposed raised rail bodies 370, 372 and raised center body 374 formed on an integral stepped portion 378 forming raised bearing surfaces 380-1, 380-2, 380-3 and stepped bearing surface 382. In the embodiment illustrated, the slider body includes a recessed cavity 384 along an intermediate center portion of the slider body. The raised rail bodies 370, 372 are formed proximate to opposed sides 144-29, 146-29 of the slider body to form raised bearing rails and the raised center body 374 is formed proximate to the center portion to form a raised center pad. As shown the stepped portion is configured to interface with the raised rail bodies and center body to provide cooperating raised bearings surfaces as described.

An air bearing for a slider including cooperating raised bearing surfaces or portions (such as 214-1, 214-2, 280, 282, 284) along a trailing edge portion 176 of the slider. The cooperating raised bearing surfaces (such as 214-1, 214-2, 280, 282, 284) are formed on a stepped bearing surface or portion (such as 216, 272) which is elevated above a recessed bearing surface (such as 218, 274). The cooperating raised bearing surfaces or portions form raised bearing rails or rails portions or a raised center pad or raised center pad portion on the stepped bearing surface (such as 216, 272) to reduce cross curve sensitivity.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. In addition, although the preferred embodiment described herein is directed to a particular data storage system, it will be appreciated by those skilled in the art that the teachings of the present invention can be applied to other data storage systems, without departing from the scope and spirit of the present invention.

What is claimed is:

1. A slider comprising:
   a slider body including a trailing edge, a leading edge, a first side edge and a second side edge;
   an air bearing including a cavity surface, a stepped bearing surface elevated from the cavity surface and recessed below a raised bearing surface and the stepped bearing surface having opposed side edges spaced from the first and the second side edges of the slider body and the stepped bearing surface having a trailing edge adjacent to the trailing edge of the slider body and the trailing edge of the stepped bearing surface having a width extending a majority of a difference between the first and second side edges; and
   rail portions elevated from the cavity surface and spaced from the opposed side edges of the stepped bearing surface and the rail portions extending along the first and second side edges of the slider body.

2. The slider of claim 1 including a plurality of raised bearing surfaces on the stepped bearing surface elevated from the cavity surface proximate to the trailing edge of the slider body.

3. The slider of claim 2 wherein the plurality of raised bearing surfaces are generally "U" shaped.

4. The slider of claim 2 wherein the plurality of raised bearing surfaces include a center pad and opposed side rails.

5. The slider of claim 4 wherein the center pad is on a center portion of the stepped bearing surface and the opposed side rails are formed along side portions of the stepped bearing surface.

6. The slider of claim 1 wherein the stepped bearing surface is "U" shaped including a stepped center portion adjacent to the trailing edge and stepped side rails extending from the stepped center portion toward the leading edge.

7. The slider of claim 1 and further comprising a cross rail proximate to the leading edge of the slider body and the stepped bearing surface extends from the cross rail to the trailing edge of the slider body.

8. The slider of claim 7 wherein the cross rail is elevated from the stepped bearing surface to form a raised bearing surface proximate to the leading edge.

9. A slider comprising:
   a slider body including a leading edge, a trailing edge, a first side edge, a second side edge and a cross width between the first side edge and the second side edge;
   an air bearing surface including a cavity surface and a stepped bearing surface elevated from the cavity surface and recessed from a raised bearing surface along a trailing edge portion of the slider body and including a cavity step from the cavity surface to the stepped bearing surface in a direction of the trailing edge and the stepped bearing surface having a cross width dimension between opposed sides of the stepped bearing surface that is larger than one-half of the cross width dimension of the slider body and a height of a step from the stepped bearing surface to the raised bearing surface is smaller than the cavity step from the cavity surface to the stepped bearing surface; and
   a cross rail elevated from the cavity surface proximate to the leading edge and the stepped bearing surface extending from the cross rail in a direction toward the trailing edge of the slider body.

10. The slider of claim 9 including a plurality of raised bearing surfaces on the stepped bearing surface.

11. The slider of claim 10 wherein the plurality of raised bearing surfaces include a center pad and opposed side rails.

12. The slider of claim 10 wherein the slider body includes opposed rails elevated from the cavity surface on opposed sides of the stepped bearing surface.

13. The slider of claim 9 wherein the stepped bearing surface is "U" shaped.

14. The slider of claim 13 wherein the "U" shaped stepped bearing surface includes a center portion proximate to the trailing edge and opposed side portions which extend in a direction towards the leading edge.

15. The slider of claim 14 wherein the center portion of the "U" shaped stepped bearing surface includes a raised center pad and the opposed side portions of the "U" shaped stepped bearing surface include raised side pads elevated from the stepped bearing surface.

16. A slider comprising:
   a slider body including a leading edge, a trailing edge and a cross width between a first side edge and a second side edge; and
   an air bearing surface including a U shaped stepped bearing surface elevated from a cavity surface and recessed from a raised bearing surface along a trailing edge portion of the slider body and the U shaped stepped bearing surface having a cross width between opposed sides of the stepped bearing surface and a center portion and spaced rail portions which extend from the center portion in a direction toward the leading edge and including a raised center pad on the center portion of the stepped bearing surface and raised side pads on the spaced rail portions of the stepped bearing surface wherein the raised center pad and the raised side pads are "U" shaped.

17. The slider of claim 16 wherein the stepped bearing surface extends from a raised cross rail proximate to the leading edge of the slider body.

18. The slider of claim 16 wherein a cross width dimension of a trailing edge of the stepped bearing surface proximate to the trailing edge of the slider body is larger than half of a cross width dimension between the first and second side edges of the slider body.

* * * * *